United States Patent
Cliffe

(10) Patent No.: US 11,155,740 B2
(45) Date of Patent: Oct. 26, 2021

(54) SHALE HYDRATION INHIBITOR AND METHOD OF USE

(71) Applicant: M-I L.L.C., Houston, TX (US)

(72) Inventor: Steve Cliffe, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/516,675

(22) PCT Filed: Oct. 8, 2015

(86) PCT No.: PCT/US2015/054609
§ 371 (c)(1),
(2) Date: Apr. 4, 2017

(87) PCT Pub. No.: WO2016/057746
PCT Pub. Date: Apr. 14, 2016

(65) Prior Publication Data
US 2017/0247595 A1    Aug. 31, 2017

Related U.S. Application Data

(60) Provisional application No. 62/061,410, filed on Oct. 8, 2014.

(51) Int. Cl.
| | | |
|---|---|---|
| C09K 8/035 | (2006.01) | |
| C09K 8/12 | (2006.01) | |
| C09K 8/68 | (2006.01) | |
| E21B 21/00 | (2006.01) | |

(52) U.S. Cl.
CPC ........... *C09K 8/035* (2013.01); *C09K 8/12* (2013.01); *C09K 8/68* (2013.01); *E21B 21/00* (2013.01); *C09K 2208/12* (2013.01)

(58) Field of Classification Search
CPC ...... C09K 2208/12; C09K 8/035; C09K 8/12; C09K 8/68; C09K 8/86; E21B 21/00
See application file for complete search history.

(56) References Cited

U.S. PATENT DOCUMENTS

| 5,178,786 A | 1/1993 | Jahnke et al. | |
|---|---|---|---|
| 6,247,543 B1 * | 6/2001 | Patel | C09K 8/22 |
| | | | 175/64 |
| 6,857,485 B2 | 2/2005 | Patel et al. | |
| 2003/0106718 A1 * | 6/2003 | Patel | C09K 8/06 |
| | | | 175/64 |

(Continued)

FOREIGN PATENT DOCUMENTS

| WO | 2006/013596 A1 | 2/2006 |
|---|---|---|
| WO | 2014/004193 A1 | 1/2014 |

OTHER PUBLICATIONS

International Search Report for the equivalent International patent application PCT/US2015/054609 dated Nov. 24, 2015.

(Continued)

*Primary Examiner* — Alicia Bland

(57) ABSTRACT

Wellbore fluids may contain alkyl amine and cyclic organic acid complexes capable of controlling hydration in swellable formations such as shale- and clay-containing formations. Further, methods of drilling may utilize wellbore fluids containing a base fluid and a complex of alkyl amine and a cyclic organic acid.

10 Claims, 2 Drawing Sheets

(56) References Cited

U.S. PATENT DOCUMENTS

2009/0247429 A1* 10/2009 Miller ............... C09K 8/22
507/130
2010/0144561 A1 6/2010 Patel et al.

OTHER PUBLICATIONS

Written Opinion for the equivalent International patent application PCT/US2015/054609 dated Nov. 24, 2015.
International Preliminary Report on Patentability for the equivalent International patent application PCT/US2015/054609 dated Apr. 20, 2017.
CEFAS (Centre for Environment Fisheries and Aquaculture Science), BODIS Protocols from "Cefas audits of HOCNF Substance Test Reports: Review and Recommendations," United Kingdom, 2019, 35 pages.
OECD Guideline for Testing of Chemicals, Biodegradability in Seawater, Jul. 17, 1992, 27 pages.

* cited by examiner

SHALE HYDRATION INHIBITOR AND METHOD OF USE

This application claims the benefit of U.S. Provisional Application No. 62/061,410 filed on Oct. 8, 2014, which is incorporated by reference herein in its entirety.

BACKGROUND

To facilitate the drilling operations, wellbore fluids are circulated through the drill string, out the bit and upward in an annular area between the drill string and the wall of the borehole. Common uses for wellbore fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, transmitting hydraulic horsepower to the drill bit, fluid used for emplacing a packer, abandoning the well or preparing the well for abandonment, and otherwise treating the well or the formation.

Water-based drilling fluids are often selected for use in a number of hydrocarbon plays, because of the lower associated cost and better environmental acceptance as compared to oil-based drilling fluids continue to make them the first option in drilling operations. However, selection of a suitable fluid may depend on the type of formation through which the well is being drilled. For example, subterranean formations may be at least partly composed of clays, including shales, mudstones, siltstones, and claystones, that swell in the presence of water, which can increase drilling time and costs.

While drilling in clay-containing formations, problems encountered may include bit balling, swelling or sloughing of the wellbore, stuck pipe, and dispersion of drill cuttings. Further, these problems may be exacerbated as the water content of the drilling fluid increases due to clay hydration in aqueous environments.

DETAILED DESCRIPTION

Figure 1:
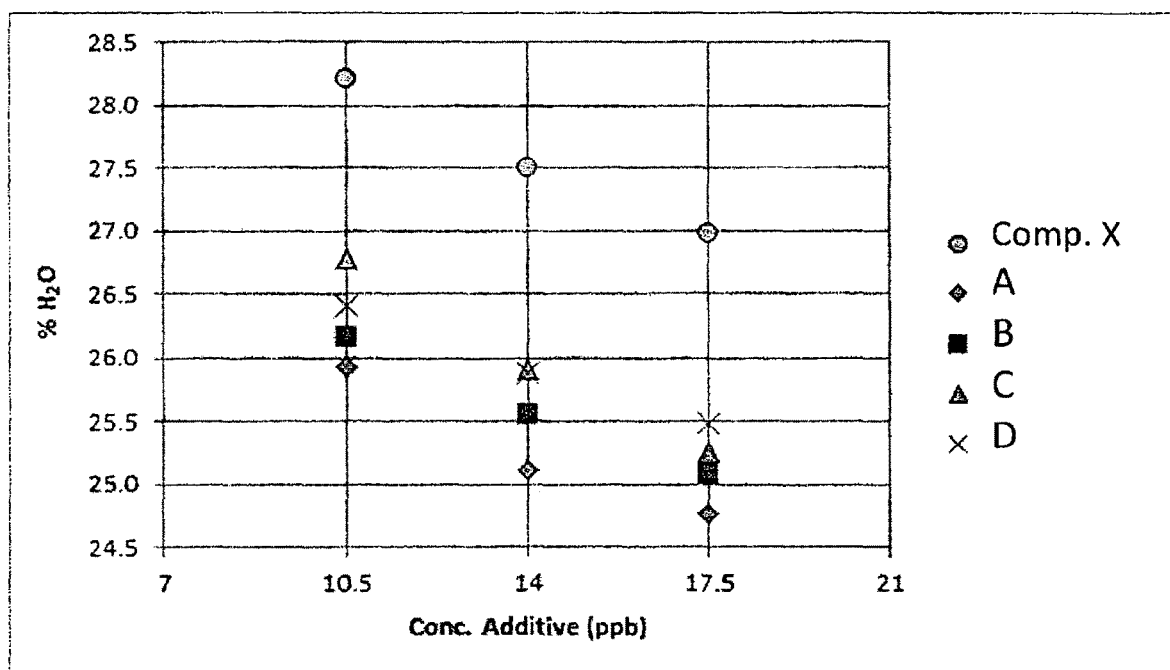
FIG. 1 is a graphic representation of the change in percent hydration of a shale sample as a function of combined shale inhibitor additive concentration.

In one aspect, embodiments disclosed herein relate to a water-based wellbore fluid for use in drilling wells through a formation containing shale that swells in the presence of water. Wellbore fluids in accordance with the present disclosure may be formulated to include shale hydration inhibitors that promote retention of the wellbore fluid within the wellbore and prevent fluid loss due to absorption by clays and other hydrophilic minerals. In one or more embodiments, wellbore fluid additives may include salt complexes formed from the neutralization reaction of one or more alkyl amines with one or more cyclic organic acids.

While most of the terms used herein will be recognizable to those of skill in the art, the following definitions are put forth to aid in the understanding of the present disclosure. It should be understood, however, that when not explicitly defined, terms should be interpreted as adopting a meaning presently accepted by those of skill in the art.

The term "alkyl" as used herein, unless otherwise specified, refers to a saturated straight chain, branched or cyclic hydrocarbon group in particular embodiments. The hydrocarbon group may be selected from, for example, methyl, ethyl, n-propyl, isopropyl, n-butyl, isobutyl, sec-butyl, t-butyl, pentyl, cyclopentyl, isopentyl, neopentyl, hexyl, isohexyl, cyclohexyl, 3-methylpentyl, 2,2-dimethylbutyl, and 2,3-dimethylbutyl. The term "cycloalkyl" refers to cyclic alkyl groups such as cyclopropyl, cyclobutyl, cyclopentyl, cyclohexyl, cycloheptyl and cyclooctyl.

Moreover, the term "alkyl" includes "modified alkyl", which references an alkyl group having from one to twenty-four carbon atoms, and further having additional groups, such as one or more linkages selected from ether-, thio-, amino-, phospho-, oxo-, ester-, and amido-, and/or being substituted with one or more additional groups including lower alkyl, aryl, alkoxy, thioalkyl, hydroxyl, amino, sulfonyl, thio, mercapto, imino, halo, cyano, nitro, nitroso, azide, carboxy, sulfide, sulfone, sulfoxy, phosphoryl, silyl, silyloxy, and boronyl. The term "alkoxy" as used herein refers to a substituent —O—R wherein R is alkyl as defined above. The term "lower alkoxy" refers to such a group wherein R is lower alkyl. The term "thioalkyl" as used herein refers to a substituent —S—R wherein R is alkyl as defined above. The term "alkoxy ether" as used herein, refers to a substituent —O—($R_1$—O)$_x$—$R_2$, wherein $R_1$ and $R_2$ are independently alkyl groups as defined above, and where X may be any integer between 1 and 10.

The term "alkylene" as used herein, unless otherwise specified, refers to a bivalent saturated alkyl chain (such as ethylene) regarded as derived from an alkene by opening of the double bond or from an alkane by removal of two hydrogen atoms from different carbon atoms.

The term "alkenyl" as used herein, unless otherwise specified, refers to a branched, unbranched or cyclic (e.g. in the case of C5 and C6) hydrocarbon group of 2 to 30, or 2 to 12 in some embodiments, carbon atoms containing at least one double bond, such as ethenyl, vinyl, allyl, octenyl, decenyl, dodecenyl, and the like. The term "lower alkenyl" intends an alkenyl group of two to eight carbon atoms, and specifically includes vinyl and allyl. The term "cycloalkenyl" refers to cyclic alkenyl groups.

Inhibition of Shale Hydration

Clay swelling during the drilling of a subterranean well can have a tremendous adverse impact on drilling operations. The overall increase in bulk volume accompanying clay swelling impedes removal of cuttings from beneath the drill bit, increases friction between the drill string and the sides of the borehole, and inhibits formation of the thin filter cake that seals formations. Clay swelling can also create other drilling problems such as loss of circulation or stuck pipe that slow drilling and increase drilling costs.

Clay minerals encountered in subterranean formations are often crystalline in nature, which can dictate the response observed when exposed to drilling fluids. Clays may have a flaky, mica-type structure made up of crystal platelets stacked face-to-face. Each platelet is called a unit layer, and the surfaces of the unit layer are called basal surfaces. Each unit layer is composed of multiple sheets, which may include octahedral sheets and tetrahedral sheets. Octahedral sheets are composed of either aluminum or magnesium atoms octahedrally coordinated with the oxygen atoms of hydroxyls, whereas tetrahedral sheets contain silicon atoms tetrahedrally coordinated with oxygen atoms.

In clay mineral crystals, atoms having different valences may be positioned within the sheets of the structure to create a negative potential at the crystal surface, which causes cations to be adsorbed thereto. These adsorbed cations are called exchangeable cations because they may chemically trade places with other cations when the clay crystal is suspended in water. In addition, ions may also be adsorbed on the clay crystal edges and exchange with other ions in the water.

The clay crystal structure and the exchangeable cations adsorbed on the crystal surface can affect clay swelling. Clay swelling is the phenomenon in which water molecules surround a clay crystal structure and position themselves to increase the structure's d-spacing, which results in a measureable increase in volume. Two types of swelling may occur: surface hydration and osmotic swelling.

Surface hydration is one type of swelling in which water molecules are adsorbed on crystal surfaces. Hydrogen bonding holds a layer of water molecules to the oxygen atoms exposed on the crystal surfaces. Subsequent layers of water molecules align to form a quasi-crystalline structure between unit layers, which results in an increased d-spacing. Virtually all types of clays swell in this manner.

Osmotic swelling is a second type of swelling. Where the concentration of cations between unit layers in a clay mineral is higher than the cation concentration in the surrounding water, water is osmotically drawn between the unit layers and the d-spacing is increased. Osmotic swelling results in larger overall volume increases than surface hydration. However, only certain clays, like sodium montmorillonite, swell in this manner.

In one or more embodiments, clay swelling may be inhibited through the use of organic shale inhibitors and complexes of shale inhibitors that may reduce the aforementioned drawbacks of conducting operations in clay-containing formations. While not limited by any particularly theory, it is believed that the shale inhibitors in accordance with the present disclosure may be adsorbed on the surfaces of clays and effectively repel or compete with free water for reactive sites and thus serve to reduce water penetration and clay swelling.

In one or more embodiments, wellbore fluids may include a base fluid, a shale inhibiting additive that may include salt complexes formed from the neutralization reaction of one or more cyclic organic acids with one or more alkyl amines, and other wellbore fluid additives that may present depending on the particular application.

Cyclic Organic Acids

In one or more embodiments, shale inhibiting additives may include a cyclic organic acid having a general structure in which one or more carboxylic acid groups are present on a molecule that also contains a cyclic hydrophobic moiety such as an aromatic or non-aromatic cyclic or polycyclic group. Cyclic organic acids in accordance with the present disclosure may be selected, for example, from carboxylic and polycarboxlyic acids containing a cyclic alkyl group containing 5 to 10 carbon atoms. Examples include cyclopentanoic acid, cyclohexanoic acid, cycloheptanoic acid, etc. In some embodiments, the cyclic organic acid may also include polycyclic structures, including bicyclic and tricyclic fused ring systems where each ring may be 4-9 membered, contain one or more heteroatoms chosen from O, N or S and contain zero or one or more C—C double or triple bonds.

In some embodiments, cyclic organic acids may include aromatic acids selected from monocarboxylic aromatic acids such as benzoic acids, toluic acids, e.g., isomeric meta-, para-, and ortho-methyl benzoic acids, naphthoic acids, anthracene carboxylic acids, phenanthracene carboxylic acids, fluorene carboxylic acids, pyrene carboxylic acids, and the like; dicarboxylic aromatic acids such as phthalic acid, isophthalic acid, and terephthalic acid; polycarboxylic aromatic acids such as trimesic acid, naphthalene-2,6-dicarboxylic acid, 4,4'-diphenyldicarboxylic acid, pyridine-2,5-dicarboxylic acid, pyridine-2,4,6-tricarboxylicacid, furan-2,5-dicarboxylic acid, thiophene-2,5 dicarboxylic acid, etc. Aromatic acids may also include heteratomic or heteraryls groups containing monocyclic or polycyclic ring systems containing one or more heteroatoms including carboxylic and polycarboxylic acids containing heterocyclic moieties such as pyridyl, pyrlium, thiopyrilium, pyrrolyl, furyl, thienyl, indolinyl, etc.

In one or more embodiments, the cyclic organic acid may be present in a wellbore fluid at a concentration that ranges from 0.5 ppb to 40 ppb. In yet other embodiments, the cyclic organic acid may be present in the wellbore fluid at concentrations that range from 1 ppb to 35 ppb.

Alkyl Amines

In one or more embodiments, an alkyl amine may be present in a wellbore fluid to decrease or eliminate water uptake by reactive shales, thereby preventing fluid loss to clay-rich formations. In some embodiments, the alkyl amine may be a molecule containing one or more amino groups that may be may be primary, secondary, tertiary, or quaternary. In some embodiments, alkyl amines may have of varying levels of alkyl substitution including, for example, tertiary amines such as trimethylamine and triethylamine, and tetra-substituted alkyl amines such as alkyl quaternary ammonium compound typified by tetraethylammonium, tetrabutylammonium, and the like; and alkylbenzyl quaternary ammonium compounds including one or more alkyl chains and one or more aromatic groups such as benzyltrimethyl-ammonium, benzyltriethylammonium, and the like. In some embodiments, any of the alky amines listed herein may be added to a wellbore fluid with as a salt prepared from a reaction of the quaternary amine with a salt such as a halide or hydroxide. Further, in one or more embodiments the alkyl amine may be selected from alkyl quaternary ammonium compounds having alkyl substituents independently selected from alkyl chain lengths ranging from 1 to 6 carbons in length, aromatic groups such as benzyl or phenyl groups, and cycloalkyl groups such as cyclopentyl or cyclohexyl.

Suitable alkyl amines also include polyamines having two or more amino groups, at least one of which is present in an alkyl chain, such as a polyalkylene amine, and polyamines containing two or more amino groups as pendant groups from an alkyl chain, such as a polyallylamine. Amino groups in the polyamines may be primary, secondary, tertiary, or quaternary. Polyamines in accordance with the present disclosure may include polyethylenimine, spermine, spermidine, amidine, protamine, 1,6-diaminocyclohexane, cyclic amines including piperazine, cyclen, and the like. In other embodiments, polyamines may also include polylysine, cationic polymers such as polyallylamine, polyethyleneimine (PEI), polydiallyldimethylammonium halide, chitosan, or mixtures of polyamines.

Alkyl amines of the in embodiments of the present disclosure may also include polyether amines and polyalkylene amines. In one or more embodiments, polyamines may be a polyetheramine such as those commercially available under the trade name JEFFAMINE® from Huntsman Performance Products (Woodlands, Tex.). For example, JEFFAMINE® products may include triamines JEFFAMINE® T-5000 and JEFFAMINE® T-3000, and diamines such as JEFFAMINE® D-400, D-230, and D-2000. In some embodiments, polyamine additives may be selected from commercial shale inhibitors such as ULTRAHIB™ and KLAHIB™, available from M-I L.L.C. (Houston, Tex.).

In one or more embodiments, the polyamine may be a polymer having an average molecular weight of at least 1,000 Daltons (Da) in some embodiments, at least 2,000 Da in some embodiments, or may have an average molecular weight within a range of 500 Da to 100,000 Da. The average molecular weight of polymer in accordance with this disclosure may be determined using gel permeation chromatography (GPC) techniques known in the art that provide, for example, the peak average molecular weight ($M_p$) and a measure of the polydispersity index for a given polymer sample.

Alkyl amines of the present disclosure may be combined with a wellbore fluid in concentrations sufficient to inhibit clay swelling for a particular formation in a given geographic region. In some embodiments, concentrations between about 0.5 pounds per barrel (ppb) and 10 ppb are contemplated and to be functionally effective to reduce clay swelling. In other embodiments, the amine is present in the wellbore fluid at a concentration that ranges from 0.5 ppb to 40 ppb. In yet other embodiments, the alkyl amine is present in the wellbore fluid at concentrations that range from 1 ppb to 35 ppb.

In one or more embodiments, a shale inhibiting additive may include a ratio of the alkyl amine to cyclic organic acid that may be described as the molar ratio of [B+]/[A−], where the molar ratio may be within the range of 2 to 0.5 in some embodiments, from 1.5 to 0.75 in some embodiments, and 1 in yet other embodiments. In some embodiments, the shale inhibiting additive may be present in the wellbore fluid at a concentration that ranges from 0.5 ppb to 50 ppb in some embodiments, and may range from 1 ppb to 35 ppb in other embodiments.

In one or more embodiments, the wellbore fluid or concentrated fluid containing the shale inhibiting additive may have a pH that ranges from a lower limit equal to or greater than 5, 6, 7, and 8, to an upper limit of 8, 9, 10, 11, 12, and 13, where the pH may range from any lower limit to any upper limit. In other embodiments, the wellbore fluid or stock fluid containing the shale inhibiting additive have a pH that ranges from pH 10 to pH 12.5. In yet other embodiments, the wellbore fluid or stock fluid containing the shale inhibiting additive may have a pH that ranges from pH 7 to pH 13.

Wellbore Fluids

Wellbore fluids may contain a base fluid that is entirely aqueous base or contains a full or partial oil-in-water emulsion. In some embodiments, the wellbore fluid may be any water-based fluid that is compatible with the shale hydration inhibition agents disclosed herein. In some embodiments, the fluid may include at least one of fresh water, mixtures of water and water soluble organic compounds and mixtures thereof.

In various embodiments, the wellbore fluid may contain a brine such as seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, lithium, and salts of chlorides, bromides, carbonates, iodides, chlorates, bromates, formates, nitrates, oxides, sulfates, phosphates, silicates and fluorides. Salts that may be incorporated in a given brine include any one or more of those present in natural seawater or any other organic or inorganic dissolved salts. Additionally, brines that may be used in the drilling fluids disclosed herein may be natural or synthetic, with synthetic brines tending to be much simpler in constitution. One of ordinary skill would appreciate that the above salts may be present in the base fluid or may be added according to the method disclosed herein. Further, the amount of the aqueous based continuous phase should be sufficient to form a water based drilling fluid. This amount may range from nearly 100% of the wellbore fluid to less than 30% of the wellbore fluid by volume. In some embodiments, the aqueous based continuous phase may constitute from about 95 to about 30% by volume or from about 90 to about 40% by volume of the wellbore fluid.

Rheological Additives

The wellbore fluids may also include viscosifying agents in order to alter or maintain the viscosity and potential changes in viscosity of the drilling fluid. Viscosity control may be needed in some scenarios in which a subterranean formation contains varying temperature zones. For example, a wellbore fluid may undergo temperature extremes of nearly freezing temperatures to nearly the boiling temperature of water or higher during the course of its transit from the surface to the drill bit and back.

Viscosifying agents suitable for use in the formulation of the fluids of the present disclosure may be generally selected from any type of natural biopolymer suitable for use in aqueous based drilling fluids. Biopolymers may include starches, celluloses, and various gums, such as xanthan gum, gellan gum, welan gum, and schleroglucan gum. Such starches may include potato starch, corn starch, tapioca starch, wheat starch and rice starch, etc. In accordance with various embodiments of the present disclosure, the biopolymer viscosifying agents may be unmodified (i.e., without derivitization). Polymeric viscosifiers may include, for example, POLYPAC® UL polyanionic cellulose (PAC), DUOVIS®, and BIOVIS®, each available from M-I L.L.C. (Houston, Tex.).

Depending on the application, the polymeric viscosifier may be a synthetic polymer that resists degradation over time, and in some instances, under high temperature/high pressure conditions (HTHP). Thermal and pressure stable polymeric viscosifiers polymers may include for example polymers, copolymers, block copolymers, and higher order copolymers (i.e., a terpolymer or quaternary polymer, etc.) composed of monomers that may include 2-acrylamido-2-methylpropanesulfonate, acrylamide, methacrylamide, N,N dimethyl acrylamide, N,N dimethyl methacrylamide, tetrafluoroethylene, dimethylaminopropyl methacrylamide, N-vinyl-2-pyrrolidone, N-vinyl-3-methyl-2-pyrrolidone, N-vinyl-4,4-diethyl-2-pyrrolidone, 5-isobutyl-2-pyrrolidone, N-vinyl-3-methyl-2-pyrrolidone, alkyl oxazoline, poly(2-ethyl-2-oxazoline), $C_2$-$C_{12}$ olefins, ethylene, propylene, butene, butadiene, vinyl aromatics, styrene, alkylstyrene, acrylic acid, methacrylic acid, vinyl alcohol, partially hydrolyzed acrylamide or methacrylamide, and derivatives or mixtures thereof. In yet other embodiments, polymeric viscosifiers may include polyalkylene amines and polyethers such as polyethylene oxide and polypropylene oxide.

In some embodiments, the polymeric viscosifiers may include, for example, thermally stable polymeric viscosifiers such as DUROTHERM™, DURALON™, available from MI, L.L.C. (Houston, Tex.), KEMSEAL™, available from Baker Hughes, Inc. (Houston, Tex.), DRISCAL®-D, available from Phillips Petroleum Co. (Bartlesville, Olka), CYPAN™ available from National Oilwell Varco (Houston, Tex.), and ALCOMER™ 242, available from Allied Colloids Ltd (United Kingdom). In other embodiments the viscosifying agent may be IDCAP™ D, commercially available from MI L.L.C. (Houston, Tex.).

Wellbore fluids in accordance with embodiments disclosed herein may contain viscosifying agents in an amount ranging from 0.5 to 5 pounds per barrel (1.43 to 14.27 kg/m$^3$); however, more or less may be used depending on the particular wellbore diameter, annular velocity, cutting carrying capacity, quiescent time expected or desired.

Moreover, the wellbore fluids of the present disclosure may include a weight material or weighting agent in order to increase the density of the fluid. The primary purpose for such weighting materials is to increase the density of the fluid so as to prevent kick-backs and blow-outs. Thus the weighting agent may be added to the drilling fluid in a functionally effective amount largely dependent on the nature of the formation being drilled. Weighting agents or density materials suitable for use the fluids disclosed herein include galena, hematite, magnetite, iron oxides, illmenite, barite, siderite, celestite, dolomite, calcite, and the like, mixtures and combinations of these compounds and similar such weight materials that may be used in the formulation of wellbore fluids. The quantity of such material added, if any, may depend upon the desired density of the final composition. In some instances, weighting agent is added to result in a drilling fluid density of up to about 24 pounds per gallon. The weighting agent may be added up to 21 pounds per gallon in one embodiment, and up to 19.5 pounds per gallon in another embodiment.

In addition to the other components previously noted, materials generically referred to as thinners and fluid loss control agents may also optionally added to water-based wellbore fluid formulations. Of these additional materials, each may be added to the formulation in a concentration as rheologically and functionally required by drilling conditions.

In certain embodiments, the methods of the present disclosure may include providing a wellbore fluid (e.g., a drilling fluid, reservoir drill-in fluid, fracturing fluid, etc.) that contains an aqueous base fluid, a cyclic organic acid, and an alkyl amine, and placing the wellbore fluid in a subterranean formation. The selected additives may be mixed into the wellbore fluid individually or as a multicomponent additive that contains cyclic organic acid and alkyl amine, and/or other components. The additives may be added to the wellbore fluid prior to, during, or subsequent to placing the wellbore fluid in the subterranean formation.

A wellbore fluid according to the disclosure may be used in a method for drilling a well into a subterranean formation in a manner similar to those wherein conventional wellbore fluids are used. In the process of drilling the well, a wellbore fluid is circulated through the drill pipe, through the bit, and up the annular space between the pipe and the formation or steel casing to the surface. The wellbore fluid performs several different functions, such as cooling the bit, removing drilled cuttings from the bottom of the hole, suspending the cuttings and weighting the material when the circulation is interrupted.

The cyclic organic acid and alkyl amine may be added to a base fluid on location at a well-site where it is to be used, or it can be carried out at another location than the well-site. If the well-site location is selected for carrying out this step, the cyclic organic acid and amine may be dispersed in an aqueous fluid, and the resulting wellbore fluid may be emplaced in the well using techniques known in the art.

In one or more embodiments of the present disclosure, components of the wellbore fluids may be added to the wellbore simultaneously or sequentially, depending on the demands of the downhole environment. In a particular embodiment, a first component selected from a cyclic organic acid and an alkyl amine may be provided into a wellbore before adding the second component as a preflush or overflush.

Another embodiment of the present method includes a method of reducing the swelling of shale in a well whereby a water-base fluid formulated in accordance with the teachings of this disclosure is circulated in a well. The methods and fluids of the present disclosure may be utilized in a variety of subterranean operations that involve subterranean drilling, drilling-in (without displacement of the fluid for completion operations) and fracturing. Examples of suitable subterranean drilling operations include, but are not limited to, water well drilling, oil/gas well drilling, utilities drilling, tunneling, construction/installation of subterranean pipelines and service lines, and the like. In some embodiments, wellbore fluids may be used to stimulate the fluid production.

EXAMPLES

Example 1

Shale Hydration Inhibition of Additive Formulations

In the following example, a series of experiments were conducted to illustrate hydration inhibition in samples of Arne (illite-kaolinite) clay using wellbore fluids in accordance with the instant disclosure. Samples wellbore fluids were formulated as shown in Table 1, where polyetheramine is a diamino-functionalized JEFFAMINE™. Fluid formulations were prepared and added to shale cuttings and aged 16 hours at 150° F. (66° C.). Sample formulations are shown below in Table 1.

TABLE 1

| | Sample formulations for Example 1 | | | | | |
|---|---|---|---|---|---|---|
| | mol. wt (g/mol) | A (wt %) | B (wt %) | C (wt %) | D (wt %) | Comparison X (wt %) |
| polyetheramine D230 | 230 | 50 | 50 | 40 | 36.4 | 50 |
| benzoic acid | 122 | 30 | 35 | 35 | 38.6 | — |
| water | 18 | 20 | 15 | 25 | 25 | 16.1 |
| 50% formic acid | — | — | — | — | — | 33.9 |
| Mole ratio D230:benzoic acid | — | 1:1.13 | 1:1.32 | 1:1.65 | 1:2.00 | — |
| Mole ratio D230:formic acid | — | — | — | — | — | 1:1.70 |

Figure 2:
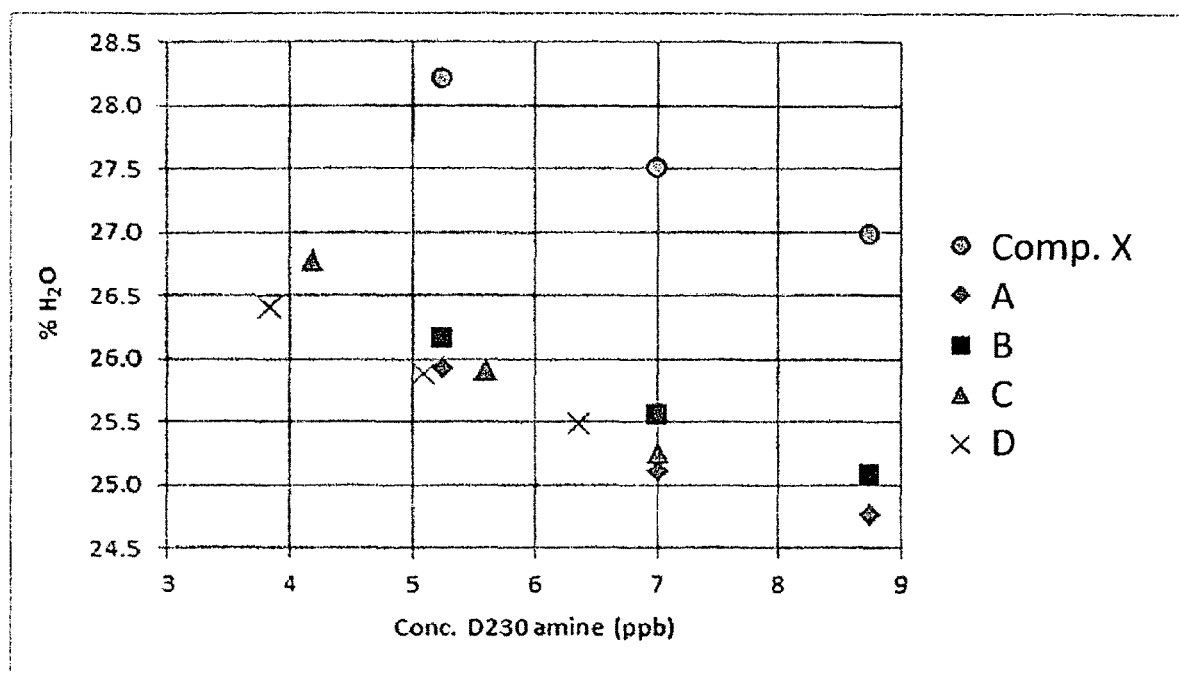
FIG. 2 is a graphic representation of the change in percent hydration of a shale sample as a function of polyamine concentration.

With particular respect to FIG. 1, the percent hydration of shale (% H₂O) as a function of sample formulations from Table 1 was assayed. In another example, the concentration of the acid was held constant while the concentration of the amine was varied. Results are shown in FIG. 2. In both trials, the data shows the combination of the alkyl amine (polyetheramine) and cyclic organic acid (benzoic acid) reduce the observed shale hydration in comparison to combinations with formic acid. In addition, while all sample ratios outperformed the comparative sample in the shale hydration trial, sample performance appeared to improve as the ratio of alkyl amine to cyclic organic acid (denoted herein as [B+]/[A−]) approached 1.

A second round of experiments was performed in order to study the hydration inhibition of Arne clays at various concentrations and component ratios. Sample formulations were prepared as shown in Tables 2 and 3, mixed with shale cuttings, and incubated at 150° F. for 16 hours and recovered on a 2 mm screen. Amines used in Table 3 are tetraethylammonium hydroxide (TEAOH), tetrabutylammonium hydroxide (TBAOH), and benzyltriethylammonium hydroxide (BenzylTMAOH).

Example 3

Biodegradation Data

In the following example, additive formulations were studied for biodegradability in order to quantify the suitability of the formulations for use in environmentally sensitive areas. One measure of sample toxicity is marine biodegradation data as outlined in Organization for Economic Cooperation and Development, Procedure OECD 306 or BODIS. Under OECD 306, the rules that governing offshore chemical use set forth three tests: bioaccumulation, biodegradation and toxicity. In order for a chemical to be used without restriction offshore in the North Sea it must satisfy two of the following three criteria: (1) biodegradation must be greater than 60%, if less than 20% it is automatically marked for substitution; (2) bioaccumulation as measured by octanol/water partitioning coefficient (log Po/w) must be below 3 (or have a molecular weight >700); and toxicity to the most sensitive marine species (often Skeletonema) must be greater than LC50 or EC50 of 10 ppm.

During the biodegradation testing, samples were formulated as show below in Table 4, where polyetheramine is a diamino-functionalized JEFFAMINE™.

TABLE 2

Hydration Inhibition Performance of Wellbore Fluid Formulations in Example 1

| Shale Hydration Inhibitor | Base Fluid | adj. pH | Shale Inhibition % Recovery | % H₂O |
|---|---|---|---|---|
| Arne clay (native water content) | — | — | — | 4.2 |
| Polyetheramine/50% formic acid/water (50/33.9/16) (10.5 ppb) | sea water | 5.2 (9) | 86.1 | 28.2 |
| Polyetheramine/50% formic acid/water (50/33.9/16) (14 ppb) | sea water | 5.9 (9) | 84.9 | 27.5 |
| Polyetheramine/50% formic acid/water (50/33.9/16) (17.5 ppb) | sea water | 7.4 (9) | 87.2 | 27.0 |
| Polyetheramine/benzoic acid/water (50/30/20) (10.5 ppb) | sea water | 9.0 | 97.5 | 25.9 |
| Polyetheramine/benzoic acid/water (50/30/20) (14 ppb) | sea water | 9.2 | 102.5 | 25.1 |
| Polyetheramine/benzoic acid/water (50/30/20) (17.5 ppb) | sea water | 9.3 | 93.8 | 24.8 |
| Polyetheramine/benzoic acid/water (50/35/15) (10.5 ppb) | sea water | 8.7 | 95.0 | 26.2 |
| Polyetheramine/benzoic acid/water (50/35/15) (14 ppb) | sea water | 8.9 | 98.8 | 25.6 |
| Polyetheramine/benzoic acid/water (50/35/15) (17.5 ppb) | sea water | 9.0 | 98.5 | 25.1 |
| Polyetheramine/benzoic acid/water (40/35/25) (10.5 ppb) | sea water | 5.3 (9) | 98.5 | 26.8 |
| Polyetheramine/benzoic acid/water (40/35/25) (14 ppb) | sea water | 5.8 (9) | 99.6 | 25.9 |
| Polyetheramine/benzoic acid/water (40/35/25) (17.5 ppb) | sea water | 7.1 (9) | 96.7 | 25.3 |
| Polyetheramine/benzoic acid/water (36.4/38.6/25) (10.5 ppb) | sea water | 4.7 (9) | 96.8 | 26.4 |
| Polyetheramine/benzoic acid/water (36.4/38.6/25) (14 ppb) | sea water | n/d (9) | 101.2 | 25.9 |
| Polyetheramine/benzoic acid/water (36.4/38.6/25) (17.5 ppb) | sea water | n/d (9) | 99.9 | 25.5 |

TABLE 3

Hydration Inhibition Performance of Wellbore Fluid Formulations in Example 1

| Shale hydration inhibitor | Brine | pH | Shale Inhibition % Recovery | % H₂O |
|---|---|---|---|---|
| Arne Clay (native water content) | — | — | — | 4.2 |
| None | sea water | 8.1 | 90.5 | 36.4 |
| TEAOH/benzoic acid/water (27.0/22.7/50.3) (19.4 ppb) | sea water | 8.1 | 75.6 | 27.9 |
| TEAOH/benzoic acid/water (27.0/22.7/50.3) (32.4 ppb) | sea water | 8.1 | 76.3 | 26.7 |
| TBAOH/benzoic acid/water (43.7/20.6/35.7) (12.0 ppb) | sea water | 7.8 | 89.7 | 30.2 |
| TBAOH/benzoic acid/water (43.7/20.6/35.7) (20.0 ppb) | sea water | 7.7 | 84.5 | 29.3 |
| BenzylTMAOH/benzoic acid/water (17.5/12.5/70) (30.0 ppb) | sea water | 8.0 | 75.8 | 26.6 |
| BenzylTMAOH/benzoic acid/water (17.5/12.5/70) (50.0 ppb) | sea water | 8.0 | 80.7 | 25.9 |
| TEAOH/oxalic acid/water (30.4/9.4/60.2) (17.3 ppb) | sea water | 8.1 | 78.8 | 34.7 |
| TEAOH/oxalic acid/water (30.4/9.4/60.2) (28.8 ppb) | sea water | 8.2 | 69.1 | 36.4 |
| TBAOH/oxalic acid/water (48.5/8.4/43.1) (10.8 ppb) | sea water | 8.1 | 81.9 | 34.9 |
| TBAOH/oxalic acid/water (48.5/8.4/43.1) (18.0 ppb) | sea water | 8.1 | 25.3 | 38.1 |
| BenzylTMAOH/oxalic acid/water (18.6/5.0/76.4) (28.8 ppb) | sea water | 8.1 | 67.7 | 31.2 |
| BenzylTMAOH/oxalic acid/water (18.6/5.0/76.4) (47.0 ppb) | sea water | 8.2 | 48.5 | 32.1 |
| Polyetheramine D230/benzoic acid/water (50/30/20) (10.5 ppb) | sea water | 9.5 | 87.0 | 26.7 |
| Polyetheramine D230/benzoic acid/water (50/30/20) (17.5 ppb) | sea water | 9.6 | 85.9 | 25.1 |

TABLE 4

Sample formulations for Example 3

|  | E | F | G | H | I |
|---|---|---|---|---|---|
| polyetheramine (wt %) | 50 | 50 | 40 | 36.4 | — |
| benzoic acid (wt %) | 30 | 35 | 35 | 38.6 | 15.0 |
| polylysine (wt %) | — | — | — | — | 45 |
| water (wt %) | 20 | 15 | 25 | 25 | 40 |
| mole ratio polyetheramine:benzoic acid (wt %) | 1:1.13 | 1:1.32 | 1:1.65 | 1:2.00 | — |

Samples were then subjected to biodegradation and results were tabulated as shown below in Table 5. Comparative samples of sodium benzoate and ULTRAHIB™ PLUS, an amine-based shale inhibitor commercially available from M-I L.L.C., were also assayed.

TABLE 5

OECD 306 Biodegradation results for Example 3

| Sample | Day 7 | Day 14 | Day 21 | Day 28 |
|---|---|---|---|---|
| E | 28% | 33% | 30% | 33% |
| F | 19% | 22% | 30% | 33% |
| G | 26% | 32% | 36% | 39% |
| H | 30% | 31% | 41% | 41% |
| I | 17% | 36% | 50% | 59% |
| Sodium benzoate (control) | 64% | 71% | 76% | 78% |
| ULTRAHIB PLUS (Polyetheramine D230/formic acid neutralized) | 11% | 12% | 16% | 6% |

Wellbore fluids described herein may be used to inhibit shale hydration and reduce fluid loss while operating in shale-containing formations. Shale hydration inhibitors in accordance with embodiments disclosed herein also may be effective at preventing the hydration of high kaolinite/high illite fraction shales and may reduce the potential for wellbore instability due to balling, agglomeration, and accretion of drill cuttings.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims. Moreover, embodiments described herein may be practiced in the absence of any element that is not specifically disclosed herein.

The foregoing description of the embodiments has been provided for purposes of illustration and description only. Although the preceding description has been described herein with reference to particular means, materials, and/or embodiments, it is not intended to be limited to the particulars disclosed herein; rather, it extends to all functionally equivalent structures, methods, and uses, such as are within the scope of the appended claims.

What is claimed:

1. A wellbore fluid, comprising:
   an aqueous base fluid; and
   a shale hydration inhibition additive comprising:
      at least one salt complex formed from a neutralization reaction of a diamino-functionalized polyetheramine and benzoic acid,
      wherein
      a molar ratio of the diamino-functionalized polyetheramine to the benzoic acid is within the range of 2 to 0.5,
      the shale hydration inhibition additive is present in the wellbore fluid at a concentration ranging from 1 ppb to 35 ppb,
      the benzoic acid is present in the wellbore fluid at a concentration range of from 1 ppb to 35 ppb, and
      the diamino-functionalized polyetheramine is present in the wellbore fluid at a concentration range of from 1 ppb to 35 ppb.

2. The wellbore fluid of claim 1, wherein the diamino-functionalized polyetheramine has a molecular weight of 2 kDa or greater.

3. The wellbore fluid of claim 1, wherein the shale hydration inhibition additive is present in the wellbore fluid at a concentration that ranges from 7 to 21 ppb.

4. The wellbore fluid of claim 1, wherein the pH of the wellbore fluid is within a range of pH 7 to pH 13.

5. The wellbore fluid of claim 1, wherein the molar ratio of the diamino-functionalized polyetheramine to the benzoic acid is within the range of 1.5 to 0.75.

6. The wellbore fluid of claim 4, wherein the pH of the wellbore fluid is within a range of pH 10 to pH 12.5.

7. The wellbore fluid of claim 1, wherein the shale hydration inhibition additive is present in the wellbore fluid at a concentration that ranges from 3 to 9 ppb.

8. A method of drilling, comprising:
   circulating the wellbore fluid, according to claim 1, into a wellbore.

9. The method of claim 8, further comprising:
   collecting the wellbore fluid subsequent to circulating the wellbore fluid.

10. The method of claim 9, further comprising:
    disposing of the collected wellbore fluid.

* * * * *